C. P. CARLSON, DEC'D.
E. CARLSON, EXECUTRIX.
SODA LYE EVAPORATOR.
APPLICATION FILED JUNE 6, 1907.

964,390.

Patented July 12, 1910.
2 SHEETS—SHEET 1.

C. P. CARLSON, DEC'D.
E. CARLSON, EXECUTRIX.
SODA LYE EVAPORATOR.
APPLICATION FILED JUNE 6, 1907.

964,390.

Patented July 12, 1910.

UNITED STATES PATENT OFFICE.

CARL PETER CARLSON, OF LÅNGBRON, DINGELVIK, SWEDEN; EBBA CARLSON, EXECUTRIX OF SAID CARL PETER CARLSON, DECEASED, ASSIGNOR OF ONE-HALF TO JOSEPH H. WALLACE & COMPANY, OF NEW YORK, N. Y., A CORPORATION OF NEW YORK.

SODA-LYE EVAPORATOR.

964,390.  Specification of Letters Patent.   Patented July 12, 1910.

Application filed June 6, 1907. Serial No. 377,515.

*To all whom it may concern:*

Be it known that I, CARL PETER CARLSON, a subject of the King of Sweden, and resident of Långbron, Dingelvik, in the Kingdom of Sweden, have invented certain new and useful Improvements in Soda-Lye Evaporators, of which the following is a specification, reference being had therein to the accompanying drawings.

This invention relates to such apparatus for the evaporating and concentrating of the spent lye in soda-pulp works, in which rotating baffle wheels are employed, the plates of which are dipped into the lye, contained in a tank, so that the lye, adhering to the plates, is carried with same upward above the liquid surface and is brought in contact with hot gases passing from a furnace, where resinous substances etc. in the concentrated lye are burned, and is concentrated by the evaporation thus effected. It has been found that bubbles from the concentrated soda lye are carried with the said gases, said bubbles forming dust, escaping with the gases. For that reason it has been proposed to arrange the baffle plates of the wheels at right angles to the rotary axis of the wheel and in zigzag order, so that not only the gases come in close contact with the lye solution adhering to the plates but also the said soda dust necessarily strikes one of the plates and is caught by the same, thus being saved.

With the construction of the baffle wheels hitherto used, they do not affect the circulation of the lye, necessary especially for the concentration of a lye rich in resinous substances. For that reason the object of this invention is to so arrange the wheels, that circulation of the lye is effected, the apparatus being thereby made practical in every respect.

Figure 1:
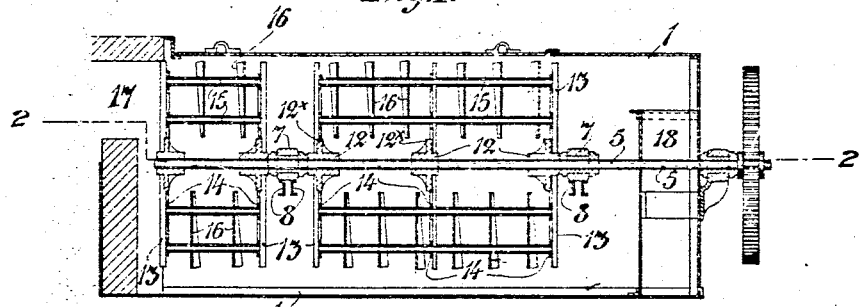
Figure 2:
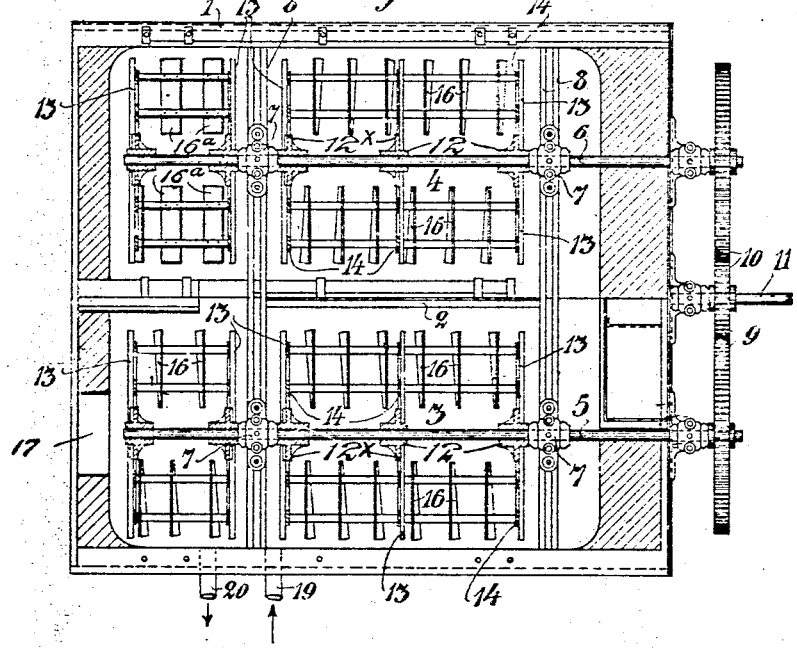
Figure 3:
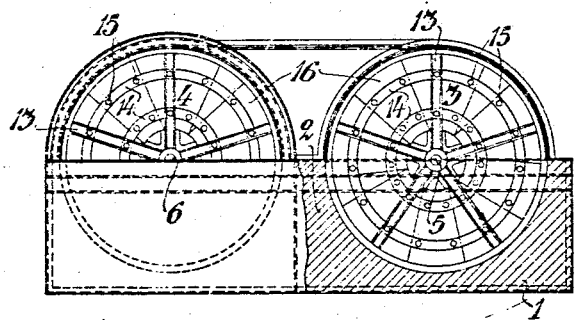
Figure 4:
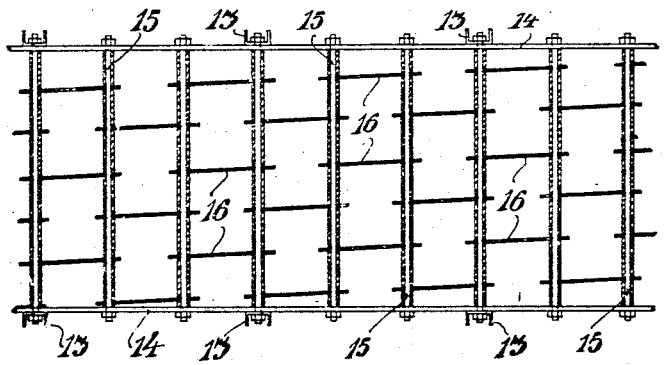

In the accompanying drawings Figure 1 is a longitudinal vertical section and Fig. 2 a plan view and partly a horizontal section of an evaporating apparatus provided with baffle wheels, arranged in accordance with my invention. The section in this figure is taken on the line 2—2 of Fig. 1, but the shafts with their bearings and the gears which are mounted upon the ends of the shafts are not shown in section. Fig. 3 is an end view and partly a cross section of the apparatus with its cover removed. Fig. 4 shows one of the wheels developed.

In a closed tank 1 for the lye two baffle wheels 3, 4, carried by shafts 5 and 6 respectively are mounted on each side of a longitudinal central partition wall 2. The said shafts are mounted in bearings 7 carried by cross beams 8, and are rotated by a shaft 11 by means of gears 9, 10. The said baffle wheels consist of arms 13 extending from hubs 12 and connected by rings 14 concentric with the shaft, and of rods 15 parallel to the shaft and fixed in the rings or the arms, which rods carry the plates or wings 16. The wheels shown in the drawings are made in three sections. When the wheels are rotated, the baffle plates are dipped into the lye contained in the tank, which lye does not fully come up to the shafts 5, 6. During the said rotation the lye adheres to the plates and follows the same upward. Hot gases generated in the soda furnace enter the tank through a channel 17 pass between the plates 16 and escape through a channel 18 leading to a fan or a chimney. Owing to the zigzag order of the plates, Fig. 4, the gases, when passing through the tank, come in close contact with the lye, carried with the plates, a rapid and efficacious evaporation being thereby effected. Owing to their position the plates prevent soda particles carried by the gases from passing through the apparatus, the said particles being on the contrary caught by the plates and transported downward into the lye. In order to prevent the gases from passing through the space between the plate set of each section of the wheels, each hub 12 is provided with a flange $12^x$ extending around the hub and outward to the inner edges of the plates.

According to this invention the plates 16 are mounted in an oblique direction to the rotary axes of the shafts, and so, that the plates of each wheel form screw threads. Owing to this arrangement the plates, when the wheel is rotated, will feed the lye longitudinally to the shafts 5 and 6 respectively. Besides, the plates of the wheels are so mounted or the wheels rotated in such direction, that one wheel, 3, moves the lye in one direction, viz., toward the right, see Fig. 2, and the other wheel 4 in the opposite direction. At the right end of the tank, no partition wall is provided. At this end the lye passes from the wheel 3 to the wheel 4. At the end of the tank the partition wall is made somewhat lower so that the lye may be moved over it by the wheel 4, the lye being circulated in this manner. In order to facilitate the moving of the lye across this part of the partition wall the left section of the wheel 4, Fig. 2, is provided with a suitable number of plates 16ᴬ parallel to the shaft of the wheel. The lye enters the tank through an opening 19 and leaves the tank through an overflow 20, having passed around the apparatus. Consequently, by my invention the advantage is gained, that the wheels put the lye in the necessary circulation in the apparatus, at the same time the wheels effect a close contact between the gases and the lye adhering to the plates and the catching of soda dust, carried with the gases.

Having now described my invention, what I claim as new and desire to secure by Letters Patent is:

1. The combination with a tank arranged to permit the passage therethrough of gases containing soda dust and adapted to contain soda lye, of a longitudinal partition wall cut through at its ends, and rotatable baffle wheels on each side of the said wall, the plates of which are mounted in an oblique position to the rotary axis of the wheel, so that the wheels cause the lye to circulate in the tank.

2. The combination with a reservoir adapted to contain a lye solution and having an inlet and an outlet for said solution and arranged to provide for the passage of gases containing soda ash dust through said reservoir over said solution, and a plurality of rotatable frames bearing baffle-plates contained in said reservoir and arranged therein to provide a continuous but tortuous passage throughout the length of the reservoir along which the lye solution is caused to travel.

3. The combination with a reservoir adapted to contain a lye solution and having an inlet and an outlet for said solution and arranged to provide for the passage of the gases containing soda-ash dust through said reservoir over said solution, a plurality of rotatable frames contained in said reservoir and arranged transversely with respect thereto, and several rows of baffle-plates borne by each frame, the baffle-plates of each row being arranged obliquely to the axis thereof, of the frame bearing them, substantially as described.

4. The combination with a reservoir adapted to contain a lye solution and having an inlet and an outlet for said solution and arranged to provide for the passage of gases containing soda-ash dust through said reservoir, over said solution, a plurality of rotatable frames contained in said reservoir and arranged transversely with respect thereto, several rows of obliquely disposed baffle-plates borne by each frame, the baffle-plates of alternate frames extending in opposite ways to tortuously circulate the lye solution throughout the reservoir, substantially as described.

5. The combination with a reservoir adapted to contain a lye solution and having an inlet and an outlet for said solution and arranged to provide for the passage of gases containing soda-ash dust through said reservoir over said solution, and a plurality of rotatable frames contained in said reservoir and arranged transversely with respect thereto, each comprising cross-bars arranged in parallel with its axis and end support therefor, and baffle-plates arranged in rows on said cross-bars, obliquely to the axis of the frame, the baffle-plates of each row being arranged opposite the spaces between the baffle-plates on the next row, substantially as described.

6. The combination with a reservoir adapted to contain a lye solution and having an inlet and an outlet for said solution and arranged to provide for the passage of gases containing soda-ash dust through said reservoir, over said solution, and a plurality of rotatable frames contained in said reservoir and arranged transversely with respect thereto, each comprising cross-bars arranged in parallel with its axis and end supports therefor, and radially disposed baffle-plates supported at each end upon a pair of cross-bars, the pair of cross-bars supporting each row of baffle-plates also supporting the adjacent sides of the adjacent rows of baffle-plates, which are staggered with respect thereto, substantially as described.

In witness whereof, I have hereunto signed my name in the presence of two subscribing witnesses.

CARL PETER CARLSON.

Witnesses:
ROBERT APELGREN,
GUSTAF ISPATT.